United States Patent [19]

Toyoda

[11] Patent Number: 4,626,925
[45] Date of Patent: Dec. 2, 1986

[54] PHOTOELECTRIC READER/PRINTER WITH VARIABLE READING AREA

[75] Inventor: Kenji Toyoda, Chigasaki, Japan

[73] Assignee: Nippon Kogaku K. K., Tokyo, Japan

[21] Appl. No.: 617,810

[22] Filed: Jun. 6, 1984

[30] Foreign Application Priority Data

Jun. 13, 1983 [JP] Japan ................................. 58-105547

[51] Int. Cl.[4] ......................... H04N 1/04; H04N 1/024
[52] U.S. Cl. .................................. 358/285; 358/286; 358/294; 355/7
[58] Field of Search ............... 358/285, 286, 293, 294, 358/256; 355/7

[56] References Cited

U.S. PATENT DOCUMENTS

| | | | |
|---|---|---|---|
| 3,346,692 | 10/1967 | Garfield et al. | 358/256 |
| 3,541,248 | 11/1970 | Young | 358/285 |
| 3,993,865 | 11/1976 | Browne et al. | 358/285 |
| 4,199,784 | 4/1980 | Wellendorf et al. | 358/293 |
| 4,256,400 | 3/1981 | Komori et al. | 355/7 |
| 4,268,164 | 5/1981 | Yajima | 355/7 |
| 4,438,459 | 3/1984 | Levine | 358/286 |
| 4,523,235 | 6/1985 | Rajchman | 358/286 |

Primary Examiner—James J. Groody
Assistant Examiner—John K. Peng
Attorney, Agent, or Firm—Shapiro and Shapiro

[57] ABSTRACT

Photoelectric reader includes a reader part for moving on an original to read image data in the original and transforming the image data into electric signals and a printer part for visualizing and fixing the electric data. The reader part is provided with an operation member for regulating the range of image data area to be read.

11 Claims, 6 Drawing Figures

4,626,925

PHOTOELECTRIC READER/PRINTER WITH VARIABLE READING AREA

BACKGROUND OF THE INVENTION

1. Field of the Invention

The present invention relates to a photoelectric reader adapted for recording an original such as document, a representative application form of which is a copier.

2. Description of the Prior Art

Document-making occupies a major part of office work. At present it is highly desired to rationalize the work of making documents and to save man power required for the work. The main solutions to this problem proposed by the prior art are to utilize typewriter, copying machine, facsimile or the like. However, the work which can be done by using such office machines is limited. The results obtained are not satisfactory.

With the tendency toward an information-oriented society, the work of collecting and keeping information is rising in importance in many businesses. Examples of such office work are to extract a desired portion from a book or data document and make up a summary of it or to pick up some key words and file them in a card. Although these kinds of work are now very important, we have not had yet any simple means for doing such work easily. The method that we can use is, for example, to make a copy of a page or pages containing the desired data or article, cut out the desired portion from the copy and paste it on a filing paper or card. Of course, this is very time-and labour-consuming. In addition, waste of copying paper is not small. Although a typewriter is available for this purpose, it is not easy for common office workers to master the machine.

SUMMARY OF THE INVENTION

An object of the invention is to provide a small-sized photoelectric reader which enables one to record only a selected portion of an original such as a portion of a page document.

To attain the above object the apparatus according to the invention includes a reader part for moving on an original to read image data in the original and transforming the image data into electric signals and a printer part for visualizing and fixing the electric data, and is characterized in that said reader part is provided with an operation member for regulating the range of image data area to be read by said reader part.

In a preferred embodiment of the invention, the printer part has a supply of printing paper and a recording head for recording on the paper such images corresponding to the electric signals. The recording head and the printing paper are displaced relative to each other in two directions in a plane. The relative displacement in one of the two directions corresponds to the movement of the reader part on the original surface. The magnitude of the displacement in the other direction corresponds to the range of a read area set by the operation member.

Other and further objects, features and advantages of the invention will appear more fully from the following description taken in connection with the accompanying drawings.

DETAILED DESCRIPTION OF PREFERRED EMBODIMENTS

Figure 1:
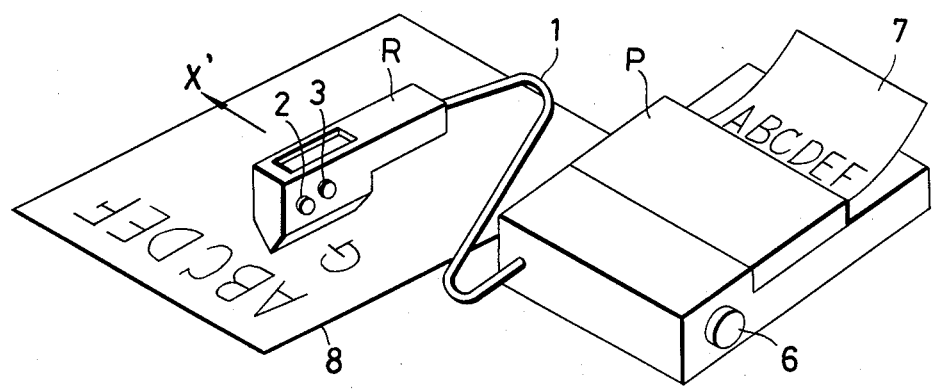
FIG. 1 is a perspective view of an embodiment of the invention.

Referring first to FIG. 1 showing an embodiment of the invention together with an original 8, the apparatus comprises a manual reader part R, a printer part P and a connection cable 1 between the two parts P and R. The reader part R is provided with a print button 2 and a paper feed button 3. By the operator's depressing the print button 2, a LED (Light Emitting Diode) array 9 in the reader part R is energized to emit light and the apparatus is brought into the state prepared for a copying operation. By depressing the paper feed button 3 a web of copying paper 7 is fed by a determined length in one direction from a supply roll in the printer part P. 6 is a manual paper feed knob for manually feeding the copying paper 7.

Figure 2:
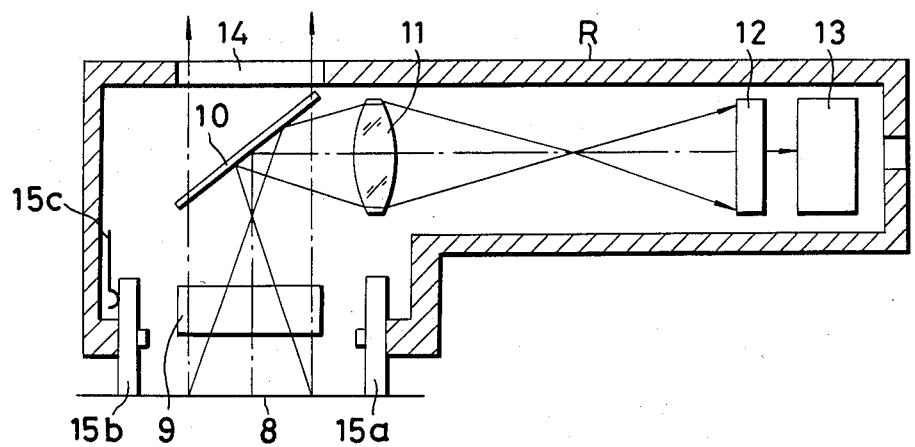
FIG. 2 is a schematic sectional view of the reader part of the embodiment.

FIG. 2 is a schematic sectional view of the reader part R. The original 8 is illuminated by the above-mentioned LED array 9. The light reflected from the original surface is guided to a linear image sensor 12 through a half mirror 10 and an image-forming lens 11. The linear image sensor 12 is constituted of a light reception part composed of charge storage-type photoelectric elements and a transfer part composed of a CCD (Charge Coupled Device). 13 is an operating circuit for processing signals coming from the linear image sensor 12. 14 is a window for observing the light transmitted through the half mirror 10, that is, the original surface to be copied.

Figure 3:
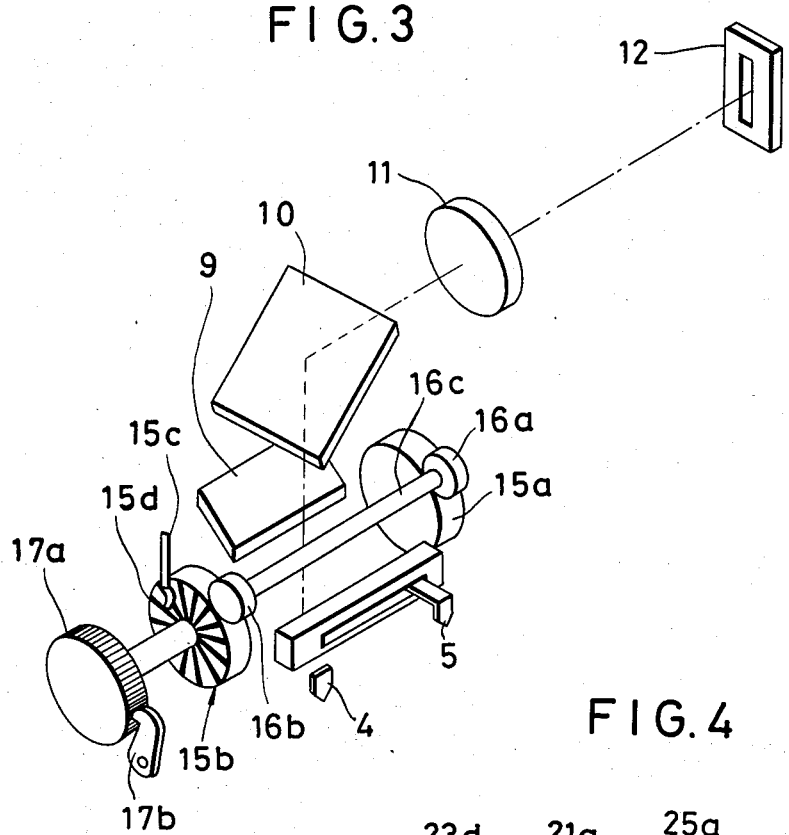
FIG. 3 is a perspective view showing an embodiment of the internal structure of the reader part.

The reader part R has a pair of wheels 15a and 15b. With the aid of the wheels, the manual reader part R can be moved stably in one direction (the direction of manual scan as indicated by the arrow X'). When the reader part R is manually scanned in the direction X', the linear image sensor 12 scans the original 8 stripwise (the scanning of the image sensor is referred to as automatic scan) while detecting every strip sectional area of the original extending in the direction nearly orthogonal to the direction X'. Further, as shown in FIG. 3, the wheel 15b has a conductor pattern 15d provided on one side surface of the wheel. A brush 15c is in contact with the surface having the conductor pattern so as to form a rotary encoder. The function of the rotary encoder is to detect the moved distance in the direction of automatic scan of the manual reader part R. For example, the rotary encoder is so formed as to generate a pulse every time when the reader part is moved a distance corresponding to the width of one strip sectional area of the original 8 detected by the image sensor 12.

FIG. 3 shows an embodiment of the arrangement of elements in the manual reader part R. Like reference characters to FIGS. 1 and 2 represent the same or corresponding elements.

4 is a fixed indicator and 5 is a movable indicator. The distance between the indicators 4 and 5 defines the range of print area of a later-described thermal head in the automatic scan direction.

16a and 16b are followers which rotate, following the rotation of the wheels 15a and 15b respectively. The followers 16a and 16b are fixed on a connection rod 16c. Therefore, when the manual reader part R is manually scanned, the two wheels 15a and 15b do the same rotation so that a stable linear scanning can be assured. Fixed on the rotating axis of the wheel 15b is a ratchet wheel 17a in which a ratchet pawl 17b is engaged to prevent the scanning of the reader part R in the opposite direction to the manual scan direction.

Figure 4:
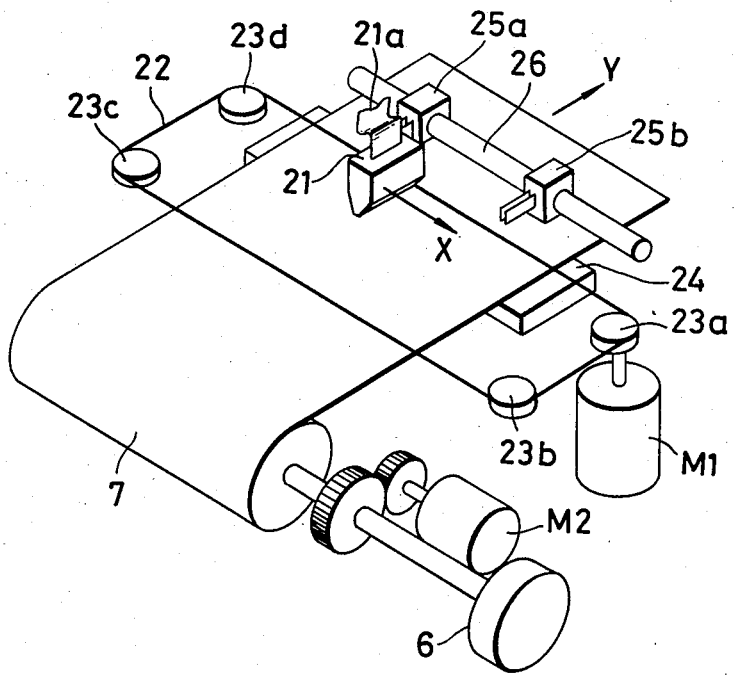
FIG. 4 is a perspective view showing the arrangement of the printer part of the embodiment.

FIG. 4 shows a concrete form of the printer part P. In this embodiment, the printer part is formed as a thermal printer. Therefore, as the copying paper 7, there is used a heat-sensitive paper.

Designated by 21 is a thermal head which contacts with the heat-sensitive paper by the portion of the head having a number of heat generator elements arranged in a row in the direction of Y. By generating heat selectively from the elements while controlling the elements the heat-sensitive paper is heated to develop color images thereon. Control signals are transmitted to the thermal head 21 through a ribbon cable 21a which does not hinder the thermal head from running.

To move the thermal head 21 a cord 22 is fastened to it. The cord 22 extends round pulleys 23a, 23b, 23c and 23d. The pulley 23a is fixed on the output shaft of a head-driving motor M1. With the rotation of the driving motor M1, the pulley 23a rotates to drive the thermal head 21 through the cord 22. The motor M1 drives the head in the direction of X' in response to the signal from the rotary encoder and moves the head backwards up to a limit switch 25a in response to the operation of the paper feed button 3. M2 is a paper feed motor which feeds the paper 7 by a determined length in response to the operation of the paper feed button 3. 24 is a platen for supporting the fed paper 7 and maintaining an appropriate contact pressure between the thermal head 21 and the paper 7.

Limit switches 25a and 25b are mounted on a guide rod 26 for slide movement along the latter to preset the moving range of the thermal head 21. The limit switch 25a determines the start position of head movement in the direction X whereas the limit switch 25b determines the end position of head movement in the direction X. When the head arrives at the end position, the limit switch 25b transmits a stop signal to a head feed control unit 42 as described later to stop driving the head. At the same time, a visual or acoustic alarm signal is generated by the stop signal to give the operator a notice of the arrival of the head at the end position. In response to the alarm signal, the operator pushes the paper feed button 3 to move the paper 7 forwardly by a determined length and also to return the head 21 to its start position. The paper feed and the head return may also be carried out automatically by directly using the signal of the limit switch 25b. In the following embodiment, the automatic method will be employed.

Figure 5:
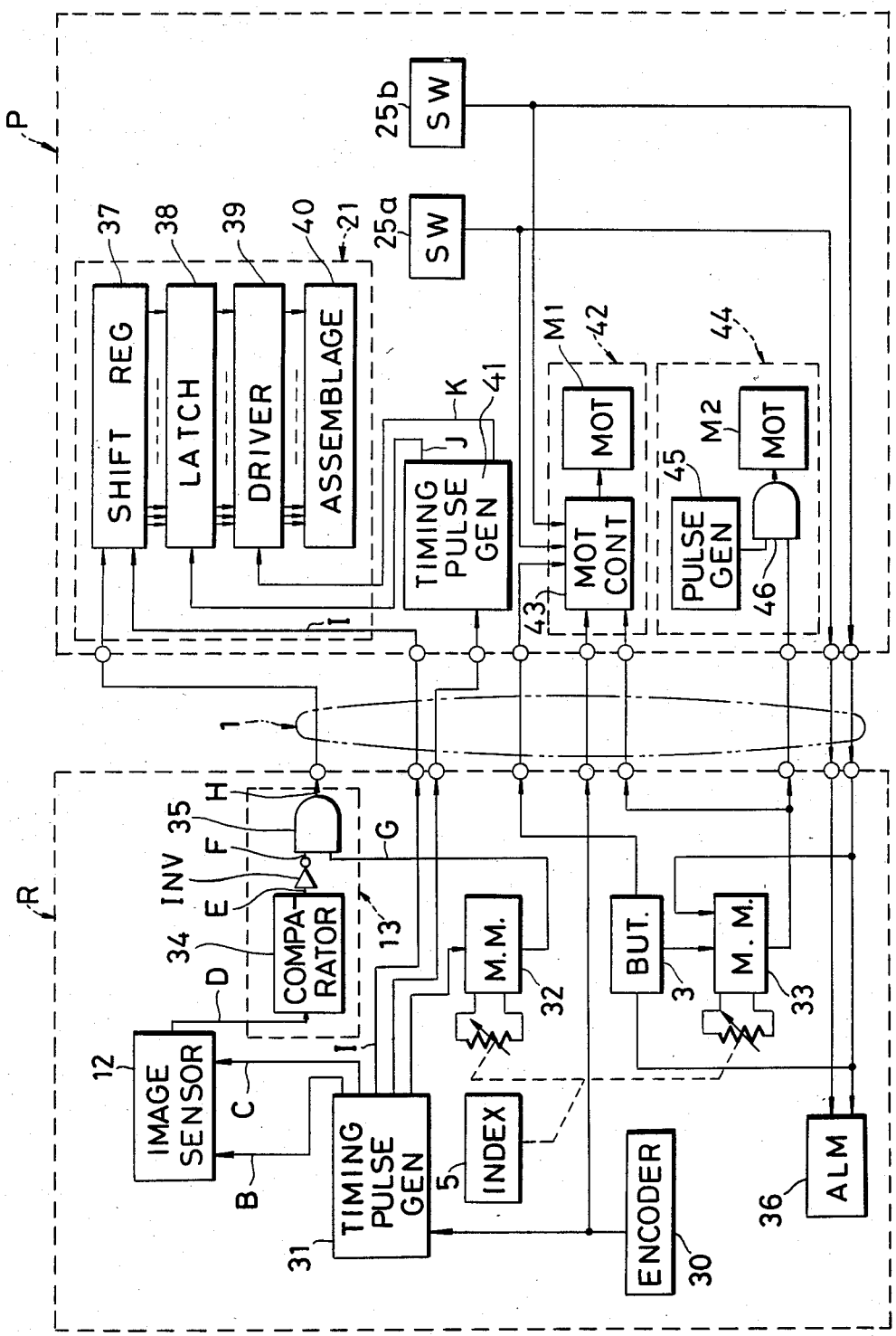
FIG. 5 is a block diagram of the embodiment.
Figure 6:
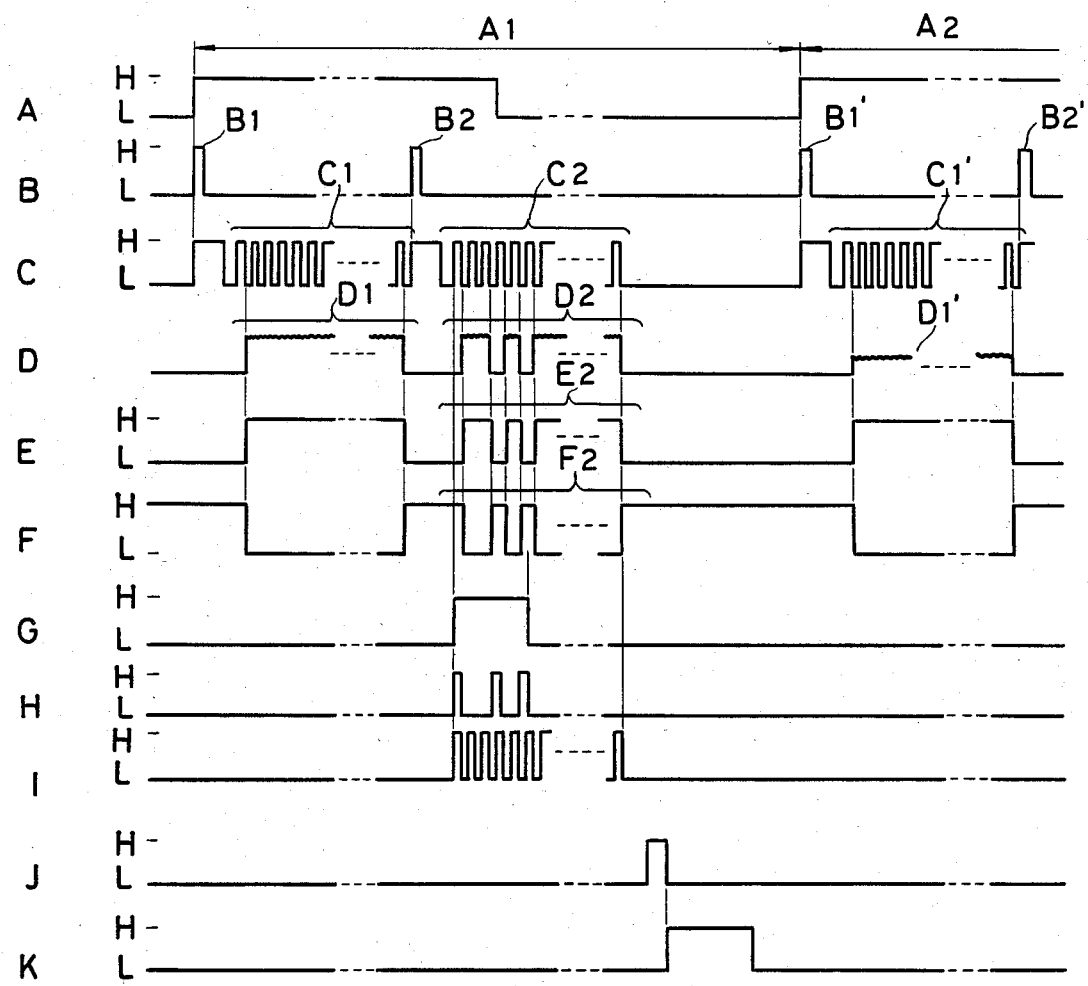
FIG. 6 is a timing chart showing the timings of signals at the respective parts of the block diagram.

FIG. 5 is a block diagram of an embodiment of apparatus according to the invention. FIG. 6 is a timing chart of signals at the respective parts of the apparatus shown in FIG. 5. Like reference characters to FIGS. 1-4 represent the same or corresponding elements.

Designated by 30 is an encoder which is composed, for example, of the conductor pattern 15d on the wheel 15b and the brush 15c as previously mentioned. A timing pulse generator 31 generates timing pulses in a later-described circuit. The pulse width of pulses generated from monostable multivibrators (M.M.) 32 and 33 is variable depending on the resistance value of a variable resistor determined by the position of the movable indicator 5. The output of the linear image sensor 12 is compared with a reference value by a comparator 34 which produces a binary output in the form of high level (referred to hereinafter as H. level) and low level (referred to as L. level). The output of the comparator 34 is applied to a gate circuit 35 through an inverter INV. The output of the monostable multivibrator 32 is also applied to the gate 35.

The thermal head 21 includes a shift register 37, latching circuit 38, driving circuit 39 and an assemblage 40 of heat generator elements arranged in series. The thermal head can be driven in the direction of X as previously shown in FIG. 4.

A second timing pulse generator 41 generates, based on the pulse signal from the first timing pulse generator 31, a pulse with which the signal from the shift register 37 is latched by the latching circuit 38 and a pulse with which the driving circuit 39 is operated by the output from the latching circuit.

Designated by 42 is a head feed control unit comprising a head-driving motor M1 and a motor control circuit 43 for controlling the motor M1. 44 is a paper feed control unit comprising a paper-feeding motor M2, a pulse generator 45 and an AND-gate 46.

The output signal A of the encoder 30 is applied to the first timing pulse generator 31. The output signal B from the generator 31 is transfer gate pulse for the CCD and the output signal C from the generator 31 is a transfer pulse for the CCD. The image sensor 12 is driven by these two output signals B and C. The output signal I is applied to a shift terminal S of the shift register 37 from the pulse generator 31. The output signal J from the second timing pulse generator 41 is applied to the latching circuit 38 to introduce the output of the shift register 37 into the latching circuit. The output signal K from the second timing pulse generator 41 is applied to the driving circuit 39 to drive the assemblage 40 in accordance with the output from the latching circuit 38 thereby performing printing on the heat-sensitive paper 7. The respective timings of the above output signals A-K are shown in FIG. 6.

The output signal from the limit switch 25a is applied to the motor control circuit 43 of the head feed control unit 42. The output signal from the limit switch 25b is applied to the motor control circuit 43 and also to an alarm device 36.

The manner of operation of the above-shown apparatus will hereinafter be described with reference to FIGS. 5 and 6.

At first the operator operates the manual paper feed knob 6 to set the leading edge of the paper 7 at a determined position and then presets the moving range of the thermal head 21 by the slide-adjustable limit switches 25a and 25b. Thereafter, the operator adjusts the movable indicator 5 to the position in which the boundary of the area to be read by every automatic scan lies between lines of the original. After completing these adjustments, the operator places the manual reader part R on the original. Since the window 14 allows the operator to observe the original surface through the half mirror 10, the operator can position the reader part R correctly. Now, the operator starts manual scanning of the reader part R while rotating the wheels 15a and 15b on the original.

With the rotation of the wheel 15b, the signal A is generated from the rotary encoder 30. In response to the rising of the signal A, the pulse generator 31 generates various timing pulses as described above. In timing with the transfer gate pulse B1 to the CCD the light reception part of the linear image sensor 12 transfers unnecessary stored charge as that by dark current to the CCD which further transfers the unnecessary charge D1 to the comparator 34 with a determined number of shift pulses C1. Since, as previously described, to the second input terminal of the AND-gate 35 is being applied the output of the monostable multivibrator 32 which is at low level at that time (see output G in FIG. 6), the unnecessary charge D1 can not be applied to the shift register 37 of the printer part P. The timing of the output of the monostable multivibrator 32 is controlled by the timing pulse generator 31 in such manner that the output of M.M. 32 becomes H level only after a determined time has passed from the rising of the pulse B2 as described later. The time period of from the rising of pulse B1 to the rising of pulse B2 is kept constant by the generator 31.

During the above discharge of the unnecessary charge D1, that is, during the time up to the next transfer gate pulse B2, an amount of photoelectric charge corresponding to the image of the original 8 is stored in the photoreception part. The image data represented by stored photoelectric charge D2 is transmitted to the transfer part from the reception part by the pulse B2 and further to the comparator 34 by the shift pulse C2. The comparator 34 converts it into a binary output E2 which is inverted by the inverter INV as shown by F2. The output F2 of the inverter is applied to one of the input terminals of the AND-gate 35. At that time a high level signal is being applied to the other terminal of the AND-gate 35 from the monostable multivibrator 32 (output G). Therefore, the output F2 of the inverter INV is read in the shift register 37 by the shift pulse I only during the period of the output G being H level as shown by output H. The reason why the output of the linear image sensor 12 is inverted by the inverter INV is that the low level output during the period of the AND-gate 35 being closed is used as white (blank) signal and the high level signal is used as black signal (corresponding to the character in the original). The signal read in the shift register 37 is latched in the latching circuit 38 by the output pulses J and K of the second timing pulse generator 41 based on the pulse from the first timing pulse generator 31. In response to the latch signal from the latch circuit 38 the driving circuit 39 drives the assemblage 40 to effect printing of the image data of the original on the heat-sensitive paper 7 by the heat generator elements of the assemblage 40. Upon the completion of the printing of the image data in one line of the linear image sensor 12, the next pulse is generated from the encoder as the reader part R moves. The above operation is repeated to record this next one line. At the time, the pulse of the encoder 30 is transmitted also to the head feed control unit 42 and the thermal head 21 is moved by the motor M1 in the direction of arrow X in FIG. 4 a distance corresponding to one line of the linear image sensor 12. In this manner, with the movement of the reader part R, reading and recording are repeated for every scanning line of the linear image sensor 12 and the original image within the width preset by the movable indicator 5 is reproduced on the heat-sensitive paper 7. Image signals of the original area beyond the width preset by the indicator 5 appear as blank signals under the action of the monostable multivibrator 32 and the AND-gate 35. Therefore, these signals have no effect on print output. When the thermal head 21 moved synchronously with the movement of the reader part R comes in contact with the limit switch 25b, the latter detects it and transmits a signal to the motor control circuit 43 of the head feed control unit 42. Thereby the motor M1 is continuously rotated in the reversed direction until the thermal head 21 comes into contact with the limit switch 25a. At the start of head return, the contact between head 21 and paper 7 is cancelled by a known mechanism not shown and the thermal head 21 moves back keeping its position upwardly apart from the paper 7.

The limit switch 25b applies a trigger signal to the M.M. 33 which then generates a pulse whose pulse width (not shown) corresponds to the width preset by the indicator 5. This pulse is applied to the AND-gate 46 of the paper feed control unit 44 so that the pulse from the pulse generator 45 is applied to the paper-feeding pulse motor M2 only for the time period corresponding to the pulse width. Thus, the motor M2 feeds the paper 7 in the direction of arrow Y in FIG. 4 only the distance corresponding to the width preset by the indicator 5. During this paper feed, in response to the signal from the limit switch 25b, the alarm device 36 generates an alarm sound or puts on an alarm lamp to give the operator a notice of the execution of paper feed. The operator stops the manual scanning of the reader part R during the generation of the alarm signal. When the alarm signal disappears, the operator can restart the manual scanning. If the operator wishes to carry out the line shift and head return before the contact of the thermal head 21 with the limit switch 25b, it can be done by the operator's depressing the paper feed button 3 on the reader part R. This depression of the button 3 makes the apparatus operate in the same manner as by the actuation of the limit switch 25b.

As readily understood from the foregoing, according to the present invention it is possible to copy only a selected portion of a document as desired by manual scanning of the reader part of the apparatus. While the present invention has been particularly shown and described with reference to a preferred embodiment thereof, it will be understood that various modifications may be therein without departing from the spirit and scope of the invention. For example, the reader part and the printer part may be connected wirelessly although a connection cable has been shown between the two parts in the above embodiment. The casing of the reader part may be formed of transparent material to allow the operator to externally observe the part of the original now being copied. Further, the wheels 15a, 15b of the reader part may be driven not manually but by a small motor. By doing so a self-running type reader part can be obtained. In this case, the thing required for the operator to do in scanning is only to put his hand on the reader part. In the above embodiment, the signals from the reader part R have been transmitted to the printer part P to record the desired original image data on a paper. However, the recording medium in not limited to paper only. For example, the signals from the reader part R may be used to record the desired original image data on a magnetic disk or magnetic tape within the scope of the present invention. It is therefore to be understood that within the scope of the appended claims, the invention may be practiced otherwise than as specifically described.

I claim:

1. Apparatus for optically reading an object comprising:
    (a) an optical system for forming an image of the object on a determined plane;
    (b) photo-electric conversion means having a light reception surface extending in one direction in a strip form, said light reception surface being disposed approximately coincident with said determined image plane and said photo-electric conversion means being able to produce photo-electric signals corresponding to the distribution of light intensity on said light reception surface in series;
    (c) displacing means for producing a relative displacement between said object and a detection area of said object, said detection area being an area conjugate with said light reception surface through said optical system and extending in one direction of said object, and said relative displacement being produced in a direction nearly orthogonal to the direction in which said detection area extends;
    (d) reading means for reading said photo-electric signals in response to the relative displacement between said detection area and said object;
    (e) setting means for setting a continuous, optionally selected sectional area within said detection area; and
    (f) means for transmitting said photo-electric signals of said photo-electric conversion means to said reading means, said transmitting means including gate means for inhibiting those photo-electric signals from being read in said reading means which correspond to an area other than said optionally set sectional area and control means for controlling said gate means in such manner that during the period corresponding to said optionally set sectional area said photo-electric signals are allowed to be transmitted to said reading means, said control means including means responsive to said setting means to generate a pulse having a pulse width corresponding to said optionally set sectional area.

2. An apparatus according to claim 1, wherein said means responsive to said setting means includes a monostable multivibrator.

3. An apparatus according to claim 1, wherein said photo-electric conversion means includes a linear image sensor and comparing means for comparing the output of said linear image sensor with a predetermined level.

4. An apparatus according to claim 3, wherein said photo-electric conversion means produces the output of said comparing means as said photo-electric signals.

5. Apparatus for optically reading an object comprising:
    (a) an optical system for forming an image of the object on a determined plane;
    (b) photo-electric conversion means including a linear image sensor having a light reception surface extending in one direction in a strip form, said light reception surface being disposed approximately coincident with said determined image plane, said linear image sensor having a plurality of elements for storing charges corresponding to the distribution of light intensity on said light reception surface, said photo-electric conversion means producing a light intensity signal according to charges which said plurality of elements store;
    (c) displacing means for producing a relative displacement between said object and a detection area of said object, said detection area being an area conjugate with said light reception surface through said optical system and extending in one direction of said object, and said relative displacement being produced in a direction nearly orthogonal to the direction in which said detection area extends;
    (d) reading means for reading said light intensity signal in response to the relative displacement between said detection area and said object;
    (e) detecting means for detecting said relative displacement, said detecting means producing a displacement signal each time a predetermined amount of said relative displacement is produced;
    (f) control means for controlling said photo-electric conversion means and for producing a first control signal in response to said displacement signal, said photo-electric conversion means producing said light intensity signal in response to said first control signal, said control means producing a second control signal after a predetermined period of time following the production of said first control signal, and said photo-electric conversion means producing said light intensity signal in response to said second control signal; and
    (g) means for transmitting said light intensity signal to said reading means, said transmitting means including gate means for inhibiting said light intensity signal which is produced in response to said first control signal from being read in said reading means.

6. An apparatus according to claim 5 which further comprises means for setting a continuous, optionally selected sectional area within said detection area, wherein said gate means inhibits a part of said light intensity signal, which part corresponds to an area other than said optionally set sectional area, from being read in said reading means.

7. An apparatus according to claim 6, wherein said transmitting means includes another control means for controlling said gate means in such manner that during a period corresponding to said optionally set sectional area, said light intensity signal is allowed to be transmitted to said reading means.

8. An apparatus according to claim 7, wherein said another control means includes means which generates a pulse having a pulse width corresponding to said optionally set sectional area.

9. Apparatus for optically reading an object and recording it on a paper, said apparatus comprising:
    (a) an optical system for forming an image of said object on a determined plane;
    (b) photo-electric conversion means having a light reception surface extending in one direction in a strip form, said light reception surface being disposed approximately coincident with said image plane and said photo-electric conversion means being able to produce photo-electric signals corresponding to the distribution of light intensity on said light reception surface;
    (c) first displacing means for producing a relative displacement between said object and a detection area of said object, said detection area being an area conjugate with said light reception surface through said optical system and extending in one direction of said object, and said relative displacement being produced in a direction nearly orthogonal to the direction in which said detection area extends;

(d) means for setting an optionally selected sectional area within said detection area;

(e) means for reading said photo-electric signals which correspond to said optionally set sectional area in response to said relative displacement between said object and said detection area;

(f) recording means having a recording head for recording on the paper a pattern corresponding to said photo-electric signals read in by said reading means;

(g) means responsive to said setting means to generate a pulse having a pulse width which changes according to said optionallly set sectional area;

(h) second displacing means for producing a relative displacement between said head and said paper in two orthogonal directions, one of the two directions of the displacement by said second displacing means corresponding to the direction of the displacement by said first displacing means whereas the other of the two directions of the displacement by said second displacement means corresponding to the extending direction of said detection area; and (i) control means for controlling said second displacement means according to the pulse width of said pulse so that the magnitude of the displacement in the other direction by said second displacing means corresponds to said optionally set sectional area.

10. An apparatus according to claim 9 which further comprises means responsive to said setting means to generate another pulse having a pulse width which changes according to said optionally set sectional area, and wherein said reading means includes latch means for latching said photo-electric signals and transmission means for transmitting said photo-electric signals from said photo-electric conversion means to said latching means.

11. An apparatus according to claim 4, wherein said transmitting means includes gate means for inhibiting those photo-electric signals from being latched in said latching means which correspond to an area other than said optionally set sectional area and another control means for controlling said gate means in such manner that during a period corresponding to the pulse width of another pulse, said photo-electric signals are allowed to be transmitted to said latch means.

* * * * *